No. 627,515. Patented June 27, 1899.
C. & F. W. MEARS.
SOFT TREAD HORSESHOE.
(Application filed Aug. 15, 1898.)
(No Model.) 2 Sheets—Sheet 1.
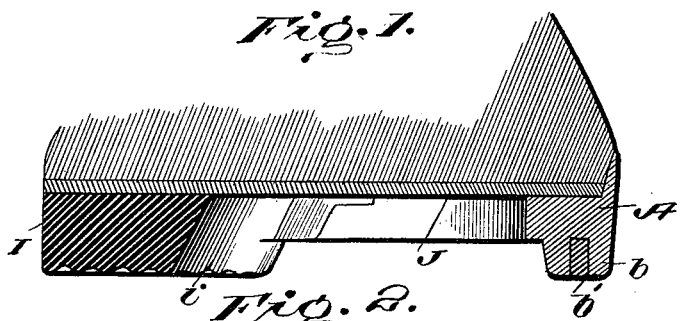
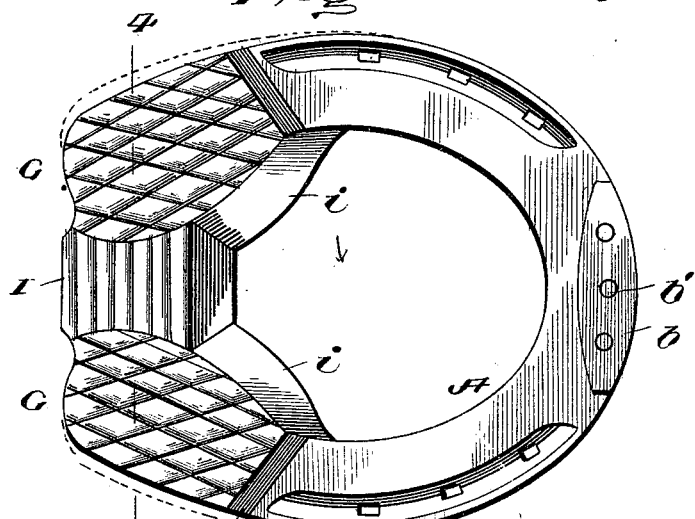
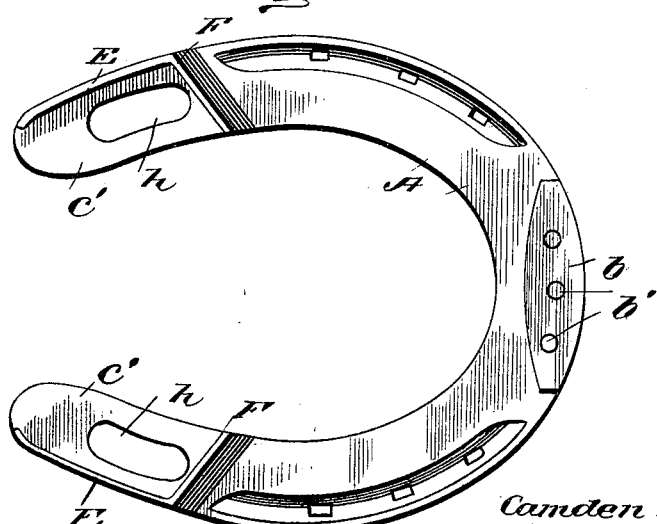
Witnesses
Inventors
Camden Mears
Frank W. Mears No. 627,515. Patented June 27, 1899.
C. & F. W. MEARS.
SOFT TREAD HORSESHOE.
(Application filed Aug. 15, 1898.)
(No Model.) 2 Sheets—Sheet 2.
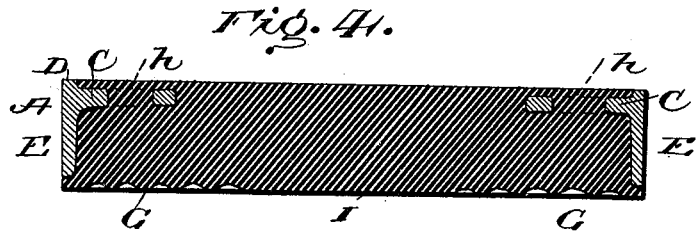
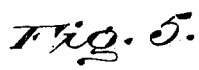 
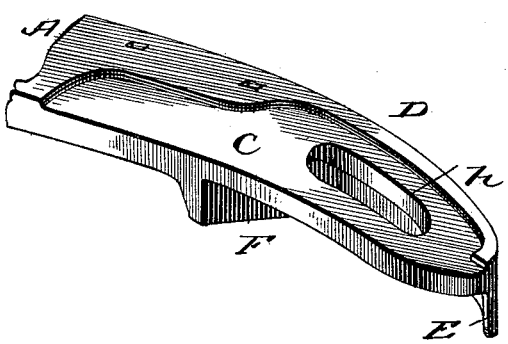 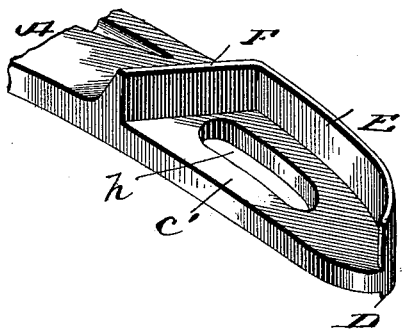
 
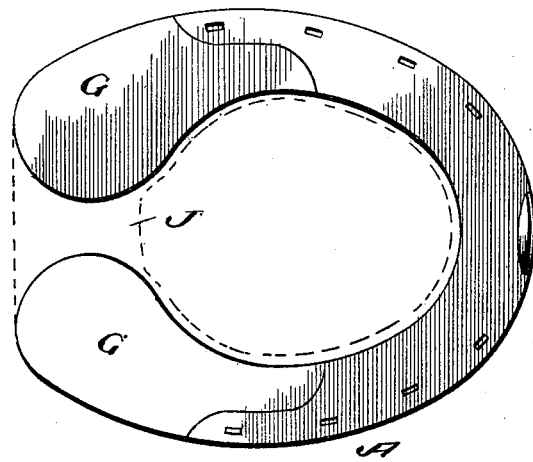 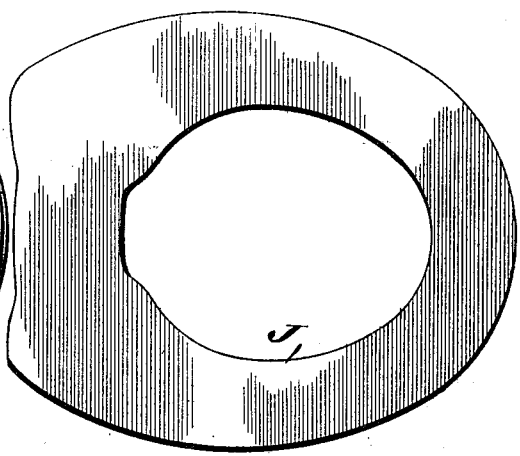
Witnesses
Inventors
Camden Mears
Frank W. Mears
by Lacey
Attorneys
THE NORRIS PETERS CO., PHOTO-LITHO., WASHINGTON, D. C.

UNITED STATES PATENT OFFICE.

CAMDEN MEARS AND FRANK W. MEARS, OF NEW YORK, N. Y.

SOFT-TREAD HORSESHOE.

SPECIFICATION forming part of Letters Patent No. 627,515, dated June 27, 1899.

Application filed August 15, 1898. Serial No. 688,617. (No model.)

*To all whom it may concern:*

Be it known that we, CAMDEN MEARS and FRANK W. MEARS, citizens of the United States, residing at New York, (Brooklyn,) in the county of Kings and State of New York, have invented certain new and useful Improvements in Soft-Tread Horseshoes; and we do hereby declare the following to be a full, clear, and exact description of the invention, such as will enable others skilled in the art to which it appertains to make and use the same.

This invention relates to improvements in elastic-tread or cushioned horseshoes, and in common with others of its kind has for its object primarily to provide a shoe equipped with one or more elastic pads adapted to prevent slipping on wet asphalt and icy roads and streets, also to absorb vibration, and thereby prevent injury to the hoof and afford relief to horses having tender feet in traveling over hard roads and paved streets.

The particular objects of our invention are to provide a horseshoe of this character which is strong and durable and adapted by its peculiar construction to give a satisfactory amount of wear; to provide a shoe of maximum strength at the fore part and having pads at the heel extending under and affording a direct elastic support between the frog of the hoof and the ground whereby the hoof is kept from contracting and the frog maintained in a healthy condition; to further increase the frog action by the provision of a full solid bar cushion extending transversely across the heel of the shoe; to provide a full-bar-cushioned shoe which may be shaped cold to fit hoofs of different contour and to compress the cushion to a greater degree of solidity to adapt it to better resist wear; to provide a cover to prevent the accumulation of gravel and filth within the sole of the hoof, obviate "balling" of snow therein, and retain a soft stuffing or medicament in contact with a tender or diseased sole, and, finally, to generally simplify and improve the construction and enhance the practical efficiency of shoes of this kind.

Further objects and advantages of the invention will appear in the course of the subjoined description.

In the accompanying drawings, forming a part of this specification, Figure 1 is a vertical longitudinal section of our improved horseshoe as applied in use. Fig. 2 is a bottom plan view of the complete shoe. Fig. 3 is a similar view of the metallic frame thereof. Fig. 4 is a transverse section through the cushioned heel of the shoe on line 4 4 of Fig. 2. Fig. 5 is a detail top perspective view of one of the heel portions of the metallic frame. Fig. 6 is a bottom perspective view thereof. Fig. 7 is a top plan view of a modified form of shoe, showing the cover in dotted lines. Fig. 8 is a plan view of the cover.

Referring now more particularly to the drawings, wherein like letters of reference designate corresponding parts throughout the several views, A represents the frame of the shoe, which may be made of steel or some other suitable metal. The fore part of this frame is provided, as usual, in each quarter with a fullering or crease in its lower face in which the nail-holes are made, but unlike other shoes of this character is not reduced and weakened by the addition of recesses or a groove or channel to receive cushions. At the toe on the bottom of the frame is a calk $b$, which is preferably rounded on its inner face, as shown, to adapt it to freely enter and leave crevices between cobblestones and Belgian blocks and turn freely therein without binding when the horse swings his foot sidewise, and thus reduce strain and obviate all liability of the shoe being pulled from the hoof.

The upper face of the frame is reduced or cut away at each side to form a seat or recess C, opening through the inner edge thereof and extending from the heel to the quarter, leaving an outer retaining-wall D, which terminates at the end of the heel. The rear portion of this part occupies nearly the entire width of the heel, while the front portion thereof is relatively narrower and is restricted to the space between the nail-holes and inner edge of the frame. The lower face of the frame is also provided at each side near the heel with a seat or recess C', formed by an outer depending wall E, projecting from the rear of the heel to a point just in rear of the nail-crease, and a front wall F, extending diagonally across said side from the front end of said outer wall and terminating a short distance in advance of the rear end of the crease.

Secured in said seats or recesses are cushions G of caoutchouc or some other suitable elastic material. These cushions may be secured by vulcanizing or mechanical fastening means and the construction of the seats may be varied to adapt them for either mode of fastening. Holes $h$ are made in the seats in the present instance to allow the upper and lower parts of each cushion to be bound together by a connecting portion of their material forced through the holes in the process of vulcanizing.

The cushions project inward a sufficient distance to bear upon and form supports for the frog of the hoof upon which the horse stands in an unshod state, but not far enough to close the central crevice between the parts of the frog. They are also somewhat thicker than the frame, so as to extend flush with or cover the upper and lower faces of the frame and provide a resilient tread, and the lower faces thereof are preferably corrugated or roughened to effectually prevent slipping on wet or slippery asphalt and icy roads and paved streets. In the preferred embodiment of our invention (shown in Figs. 1, 2, and 4) the cushions are connected at the rear by a transverse bar or bridge-piece I, made integral therewith and adapted to serve as a support and elastic tread for the bar of the hoof or frog to further increase the resiliency and promote the natural action of the frog. This bar is not used in the modified form of shoe shown in Fig. 7, in which the cushions are independent and not connected. The former construction is, however, preferred, as it provides a full or solid bar cushion which is stronger and more durable than the latter and forms a much more desirable and effective elastic tread. The front edges $i$ of the cushion in Figs. 1, 2, and 4 are preferably beveled, as shown, to allow any gravel or filth which may be picked up to readily drop down upon the ground and thus prevent accumulation.

The shoe may be shaped cold to conform to hoofs of different shapes and is secured by nails, as usual. To attain better results, we may form the frame of the shoe of malleable metal and make it a little wider than its given or graded size, so that when contracted from the dotted to the full line position shown in Fig. 2 and nailed to the hoof the cushion will be compressed into compact form to better resist wear. When the shoe is thus constructed, the toe-calk $b$ is preferably recessed or otherwise formed to receive one or more hard-metal plugs or points $b'$.

For winter wear and for horses having tender or diseased feet, where it is desired to stuff or medicate the sole of the hoof and to prevent the sole from balling in snow, we provide a cover J, of leather or other suitable material, which rests upon the upper surface of the shoe and may be secured by the nails fastening the shoe to the hoof. This cover may inclose the entire sole of the hoof, as shown in Fig. 1, or may be cut out to conform to the shape of the cushion and metal frame of the shoe, as shown in Figs. 7 and 8.

From the above description, taken in connection with the accompanying drawings, the construction and operation of our invention will be fully understood, and it will be seen that it embodies important advantages due to its peculiar construction alone. In addition to the features hereinbefore described it will be noted that the fore part of the frame of the shoe is not weakened by the formation of grooves therein for the reception of cushions and that the use of cushions is confined to the heel of the shoe. As a horse strikes his toe first and then solidly brings down the rest of the hoof it is apparent that the greatest amount of wear will fall upon the fore part of the shoe and the greatest amount of concussion or vibration upon the heel thereof. Under the ordinary method of shoeing the vibration is transmitted to the tenderest part of the sole, while the frog is liable to atrophy as it is not in action. For this reason the shoe should be strong at the toe and tread and possess as large an area of cushioned surface as possible at the heel. Our invention provides a shoe that is strong and durable, capable of being shaped to fit different forms of hoofs, and adapted to afford ample ventilation. By its use the horse is enabled to tread in a natural way and the frog maintained in a healthy and fully-developed condition.

Having thus described the invention, what is claimed as new is—

1. A horseshoe having near the heel thereof elastic cushions extending inwardly and adapted to bear upon the frog of the foot and to project vertically therefrom below the tread of the shoe to form a direct elastic support between the frog and ground, and a bar or bridge-piece also projecting below the tread and forming with said heel-cushions a full-bar cushion, and constituting a direct elastic support between the ground and bar of the frog.

2. A horseshoe comprising a metallic frame provided near the heel thereof with cushions projecting inwardly and adapted to bear upon the frog of the hoof, and a cushion-bar or bridge-piece connecting the same and adapted to bear upon the bar of the frog and hoof, the said cushions and bar being composed of a single piece of resilient material secured by vulcanizing and extended vertically below the plane of the tread of the frame to form a direct elastic support between the ground and said frog and the bar thereof, substantially as described.

3. A horseshoe comprising a metallic frame provided near the heel thereof with cushions projecting inwardly and forming elastic supports for the frog of the hoof, and a bar or bridge-piece connecting the cushions, the said cushions and bar being composed of a single piece of resilient material beveled at the front edge thereof to shed gravel and dirt and thereby prevent accumulation of the same within the hoof, substantially as described.

4. A horseshoe provided at the heel thereof with a transverse full-bar cushion adapted to bear upon the frog and bar of the foot, and to extend vertically to approximately the plane of the tread of the shoe and form a direct elastic support between both said frog and bar and the ground, substantially as described.

5. A horseshoe comprising a metallic frame A provided in its upper and lower faces at the heel with seats C and C' in communication through openings $h$, the said seat C being formed by an outer wall D and the seat C' by an outer wall E and transverse wall F, and cushions G having their upper and lower parts seated in said seats and bound by integral portions extending through said openings, said cushions extending inwardly and forming elastic supports for the frog of the hoof, substantially as described.

6. A horseshoe, comprising a malleable metal frame made somewhat wider than its normal indicated size so that it may be shaped cold and contracted at the heel and quarters to fit hoofs of different contour, and provided at the heel thereof with a full-bar cushion adapted to be compressed when the frame is contracted to better resist wear, said cushion adapted to bear upon the frog and bar of the foot and to extend vertically to approximately the plane of the tread of the shoe and form a direct elastic support between said frog and bar and the ground, substantially as described.

7. A horseshoe comprising a metallic frame A having a solid fore part, non-grooved or channeled except as to the nail-crease and provided in its upper and lower faces at the heel with seats C and C' in communication through openings $h$, the said seat C being formed by an outer wall D and the seat C' by an outer wall E and transverse wall F, cushions having their upper and lower parts seated in said seats and bound by integral portions extending through said openings, said cushions extending inwardly and forming elastic supports for the frog of the hoof, and a cover J adapted to be interposed between the shoe and hoof, substantially as described.

In testimony whereof we affix our signatures in presence of two witnesses.

CAMDEN MEARS.
FRANK W. MEARS.

Witnesses:
CHARLES A. JOHNSON,
LOUIS V. JOHNSON.